US009701418B2

United States Patent
Nelson et al.

(10) Patent No.: US 9,701,418 B2
(45) Date of Patent: Jul. 11, 2017

(54) PILOT FATIGUE DETECTION SYSTEM AND METHOD FROM AIRCRAFT CONTROL DEVICE MOVEMENT

(71) Applicant: HONEYWELL INTERNATIONAL INC., Morristown, NJ (US)

(72) Inventors: Erik T. Nelson, Eden Prairie, MN (US); Michael Dillard, Robbinsdale, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/876,679

(22) Filed: Oct. 6, 2015

(65) Prior Publication Data

US 2017/0096236 A1  Apr. 6, 2017

(51) Int. Cl.
  *G06F 7/00*  (2006.01)
  *B64D 45/00*  (2006.01)
  *G05D 1/00*  (2006.01)

(52) U.S. Cl.
  CPC ........... *B64D 45/00* (2013.01); *G05D 1/0055* (2013.01)

(58) Field of Classification Search
  CPC ........ A61B 5/18; G09B 19/165; G08B 21/06; B64D 45/0015
  USPC .......... 701/3, 4, 14–16, 29.8, 30.8; 340/438, 340/963
  See application file for complete search history.

(56) References Cited

U.S. PATENT DOCUMENTS

| 5,810,319 | A | 9/1998 | von Flotow et al. | |
|---|---|---|---|---|
| 5,900,827 | A | 5/1999 | Graham et al. | |
| 6,348,877 | B1* | 2/2002 | Berstis | G01C 23/005 340/961 |
| 6,986,486 | B2 | 1/2006 | Darbyshire | |
| 7,725,224 | B2 | 5/2010 | Goupil | |
| 8,818,573 | B2 | 8/2014 | Goupil et al. | |
| 8,855,943 | B1* | 10/2014 | Matsui | G01M 5/0033 244/1 R |
| 8,954,208 | B2 | 2/2015 | Yamasaki | |
| 2011/0137496 | A1 | 6/2011 | Everett et al. | |
| 2012/0075122 | A1 | 3/2012 | Whitlow et al. | |
| 2012/0310449 | A1* | 12/2012 | Hinnant, Jr. | B64D 45/00 701/3 |
| 2013/0138270 | A1* | 5/2013 | Christensen | G05D 1/102 701/3 |
| 2013/0323688 | A1 | 12/2013 | Whitlow et al. | |
| 2013/0338859 | A1 | 12/2013 | Yamasaki | |

FOREIGN PATENT DOCUMENTS

DE  202011108897 U1  1/2012
FR  2818932 A1  7/2002

OTHER PUBLICATIONS

R.J Patton, "Fault detection and diagnosis in aerospace systems using analytical redundancy," Computing & Control Engineering Journal (vol. 2 , Issue: 3, York University, UK, 1991.

(Continued)

*Primary Examiner* — Gertrude Arthur Jeanglaude
(74) *Attorney, Agent, or Firm* — Lorenz & Kopf, LLP

(57) ABSTRACT

A system and method for detecting pilot fatigue in an aircraft having at least an airframe and a pilot-operated aircraft control device includes detecting movements of the aircraft control device, and determining when the pilot is fatigued based on the detected movements of the aircraft control device.

18 Claims, 2 Drawing Sheets

(56) References Cited

OTHER PUBLICATIONS

Smith, B.L.; Pilot Fatigue Detection Using Aircraft State Variables; Thesis submitted to the College of Engineering and Mineral Resources at West Virginia University; Department of Mechanical and Aerospace Engineering Morgantown, WV; 2008.
Extended EP Search Report for Application No. 16192116.8-1810 dated Jan. 26, 2017.

* cited by examiner

PILOT FATIGUE DETECTION SYSTEM AND METHOD FROM AIRCRAFT CONTROL DEVICE MOVEMENT

TECHNICAL FIELD

The present invention generally relates to pilot fatigue determination, and more particularly relates to a system and method for determining pilot fatigue by detecting movements of an aircraft control device.

BACKGROUND

Aircraft pilots are subject to many factors that can lead to physical or mental fatigue, drowsiness, and inattention. Thus, commercial airline pilots are required to follow relatively strict work-rest cycles. For example, as a general rule, for domestic flights within the United States, commercial airline pilots may be limited to eight hours of flight time during a 24-hour period. Despite these requirements, pilot fatigue remains a potential concern. General aviation (GA) pilots do not have mandated work-rest cycles. Nonetheless, GA pilots can also experience undesirable fatigue while flying.

In view of the above, researchers have been exploring the idea of detecting pilot fatigue in real-time. Presently, however, the systems that have been developed to detect pilot fatigue in real-time are either too intrusive or too expensive to be considered practical. For example, systems that rely on electroencephalogram (EEG), electromyography (EMG), or periodically completing simple mental tasks can be relatively intrusive, and flight deck mounted eye-tracking systems can be relatively expensive.

Hence, there is a need for a system and method for detecting pilot fatigue that is non-intrusive and is relatively inexpensive to implement. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a pilot fatigue detection system for an aircraft having at least an airframe and a pilot-operated aircraft control device includes a processor that is coupled to receive a signal representative of detected movements of the aircraft control device and is configured, upon receipt thereof, to determine when the pilot is fatigued.

In another embodiment, a method of detecting pilot fatigue in an aircraft having at least an airframe and a pilot-operated aircraft control device includes detecting movements of the aircraft control device, and determining when the pilot is fatigued based on the detected movements of the aircraft control device.

In still another embodiment, a pilot fatigue detection system for an aircraft having at least an airframe and a pilot-operated aircraft control device includes a first sensor, a second sensor, and a processor. The first sensor is adapted to be coupled to the aircraft control device, and is configured, upon being coupled to the aircraft control device, to detect movements of the aircraft control device and provide first signals representative thereof. The second sensor is coupled to the airframe, and is configured to detect movements of the airframe and provide second signals representative thereof. The processor is coupled to receive the first signals and the second signals, and is adapted to receive an autopilot engagement signal. The processor is configured, upon receipt of the first signals and the second signals, to determine when the pilot is fatigued and generate an alert signal upon determining that the pilot is fatigued. The processor is further configured, upon receipt of the autopilot engagement signal, to not determine when the pilot is fatigued.

Furthermore, other desirable features and characteristics of the pilot fatigue detection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
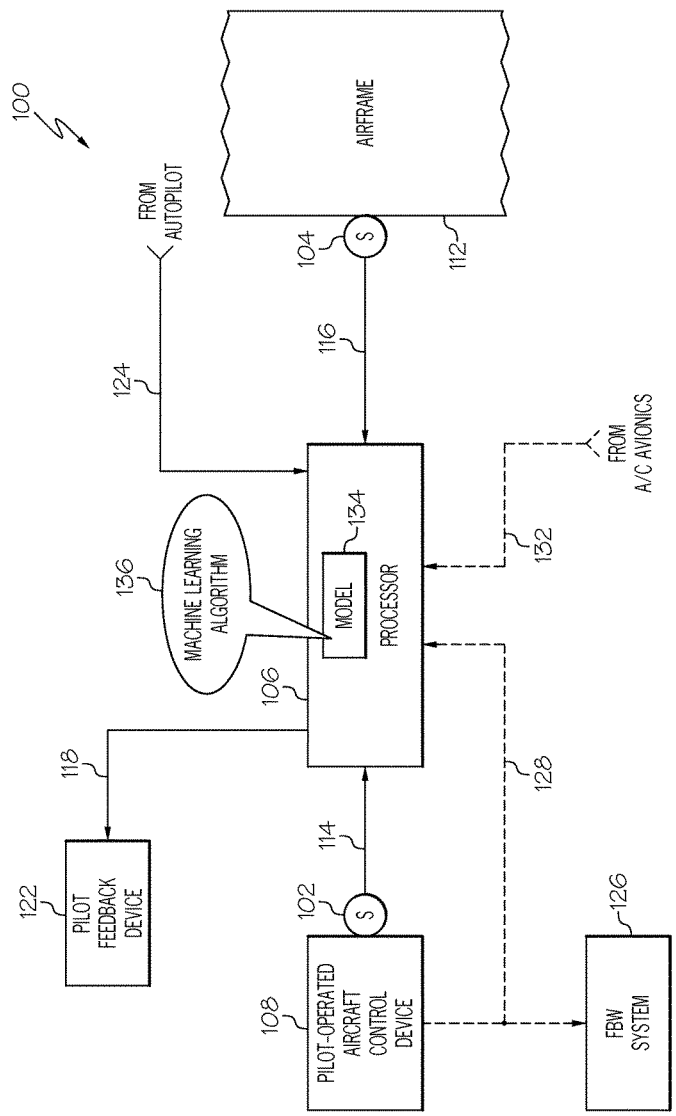
FIG. 1 depicts a functional block diagram of one embodiment of a pilot fatigue detection system.

Referring now to FIG. 1, a functional block diagram of one embodiment of a pilot fatigue detection system 100 for an aircraft is depicted, and includes a first sensor 102, a second sensor 104, and a processor 106. Before proceeding further, it is noted that the aircraft may be any one of numerous types of aircraft including, for example, various types of jet-propelled aircraft, propeller aircraft, and/or rotorcraft.

Regardless of the type of aircraft in which the system 100 is installed, the first sensor 102 is coupled to a pilot-operated aircraft control device 108, and the second sensor 104 is coupled to the airframe 112 of the aircraft. The pilot-operated aircraft control device 108 may be, for example, a yoke, a cyclic, or any one of numerous other pilot-operated aircraft control devices. As is generally known, a pilot uses a yoke to control the attitude (i.e., pitch and roll) of the aircraft. For example, when the pilot pulls the yoke back or pushes the yoke forward, the aircraft pitches up or down, respectively, and when the pilot moves the yoke to the left or right, the aircraft rolls to the left or right, respectively. As is also generally known, a cyclic allows the pilot to control the direction of travel of a rotorcraft—forward, rearward, left, and right The first sensor 102 is configured to detect movements of the aircraft control device 108, and to provide first signals 114 representative thereof. The second sensor 104 is configured to detect movements of the airframe 112 and provide second signals 116 representative thereof. It will be appreciated that the first and second sensor 102, 104 may be variously configured and implemented. For example, one or both may implemented using any one of numerous stand-alone accelerometers, or one or both may be implemented using any one of numerous known inertial measurement units (IMUs). An IMU, as is generally known, typically includes one or more accelerometers, gyroscopes, and magnetometers, and is capable of measuring velocity, angular velocity, orientation, gravitational forces (acceleration), and magnetic fields. Thus, when implemented using an IMU, the first and second signals 114, 116 may be representative of one or more of these parameters. In still other embodiments, one or both of the sensors 102, 104 may be implemented in a portable hand-held computing device, such as a smart phone, tablet, or any one of numerous other portable hand-held devices. When implemented in a portable hand-held device, the first and/or second sensor 102, 104 may be readily connected and disconnected from the system 100 and readily coupled to and decoupled from the aircraft control device 108 and/or the airframe 112.

The processor 106 is coupled to receive the first signals 114 and the second signals 116 supplied by the first and second sensors 102, 104, respectively. It will be appreciated that the processor 106 may be variously implemented. For example, the processor 106 may be a central processing unit (CPU), a graphics processing unit (GPU), an application specific integrated circuit (ASIC), a field programmable gate array (FPGA), a microcontroller, or any one or numerous other logic devices or combinations thereof. The processor 106 may also be a stand-alone device or it may be part of another aircraft or avionic system installed in the aircraft.

No matter how or where the processor 106 is specifically implemented, it is configured, upon receipt of the first and second signals 114, 116, to at least selectively determine when the pilot is fatigued. The processor 106 is further configured, upon determining that the pilot is fatigued, to generate an alert signal 118. As FIG. 1 further depicts, the alert signal 118, when generated, is supplied to a pilot feedback device 122. The pilot feedback device 122 is configured, upon receipt of the alert signal 118, to generate pilot feedback. It will be appreciated that the pilot feedback device 122 may be configured to generate various types of pilot feedback. For example, it may be configured to generate aural pilot feedback, visual pilot feedback, haptic pilot feedback, or various combinations thereof.

Before proceeding further, it is noted that in some embodiments, the system 100 may be implemented without the first and second sensors 102, 104. Instead, an integrated flight deck fly-by-wire (FBW) system 126 may be used to supply a signal 128 representative of state of the pilot-operated aircraft control device 108. More specifically, in aircraft that include a FBW system 126, when the pilot-operated aircraft control device 108 is moved, it sends a signal 128 representative of the degree to which it has been moved to a processor (not illustrated) in the FBW system 126. In some embodiments, this signal 128 may also be supplied to the processor 106, which processes the signal 128 to at least selectively determine when the pilot is fatigued and, upon determining that the pilot is fatigued, to generate an alert signal 118.

Figure 2:
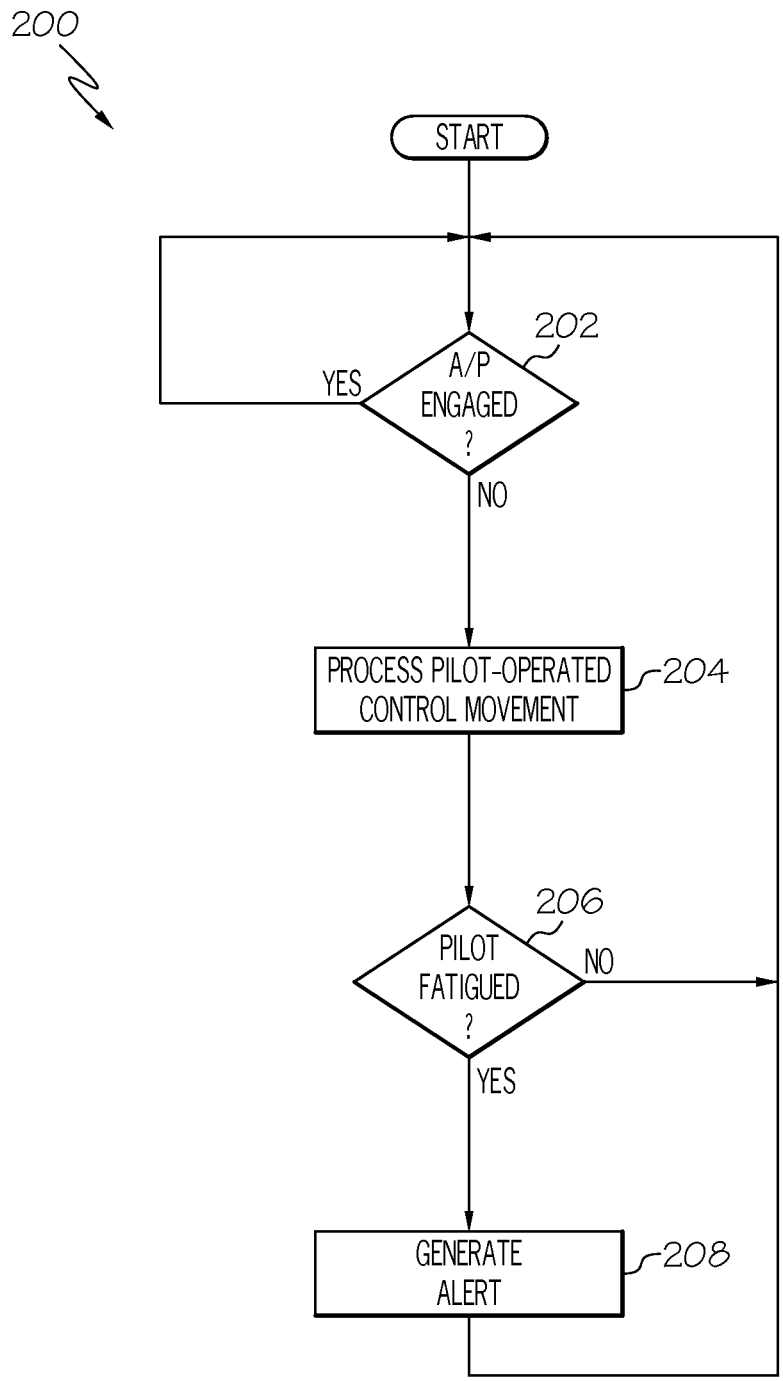
FIG. 2 depicts a process, in flowchart form, that the system of FIG. 1 may implement to detect pilot fatigue.

Referring now to FIG. 2, in combination with FIG. 1, the process 200 that is implemented in the processor 106 to determine when the pilot is fatigued will be described. In doing so, it is noted that the parenthetical reference numerals refer to like numbered flowchart blocks in FIG. 2. It should also be noted that the depicted process 200 is for an aircraft that is equipped with an autopilot. If the aircraft is not equipped with an autopilot, then the processor 106 need not implement the first step of the process that is described below.

As FIG. 2 depicts, the process 200, when implemented, determines if the autopilot is engaged (202). As is generally known, when the autopilot is engaged the pilot need not interact with the control device 108. Thus, when the processor 106 determines that the autopilot is engaged, there is no need (nor ability) to detect pilot fatigue, and the process 200 simply loops back. When the processor 106 determines that autopilot is not engaged, the process 200 proceeds to the following step. As depicted in FIG. 1, when the system 100 is installed in an aircraft that is equipped with an autopilot, the processor 106 is also coupled to receive an autopilot engagement signal 124 that indicates when aircraft autopilot is engaged and is further configured, upon receipt of the autopilot engagement signal 124, to stop determining when the pilot is fatigued. As noted above, if the aircraft is not equipped with an autopilot, then the step of determining if the autopilot is engaged (202) is not implemented.

If the autopilot is not engaged (or the aircraft is not equipped with an autopilot), the processor 106 then processes the detected movements of the pilot-operated control device 108 (i.e., the first and second signals 114, 116 or the FBW signal 128) (204), and determines whether or not the pilot is fatigued (206). If the processor 106 determines that the pilot is fatigued, it generates the alert signal (208). If the processor 106 does not determine that the pilot is fatigued, the process 200 is repeated.

It should be noted that the step of processing the detected movements of the pilot-operated control device 108 may vary, depending upon whether the system 100 uses the first and second signals 114, 116 supplied by the first and second sensors 102, 104, or the FBW signal 128 supplied by the FBW system 126. When the system 100 is configured to use the first and second signals 114, 116 supplied by the first and second sensors 102, 104, the processor 106 compares the outputs of the first and second sensors 102, 104 to detect movements of only the pilot-operated aircraft control device 108. More specifically, and as may be readily appreciated by persons of skill in the art, because the first sensor 102 is coupled to the pilot-operated aircraft control device 108, movement of the aircraft itself (e.g., acceleration and deceleration) should be accounted for in order to accurately detect movement of the pilot-operated aircraft control device 108 by the pilot. That is, the difference between the detected movements of the pilot-operated aircraft control device 108 and the aircraft accurately reflect the movement of the pilot-operated aircraft control device 108 alone. When the system 100 is configured to use the FBW signal 128, there is no need to infer movement of the pilot-operated aircraft control device 108, as the raw FBW signal 128 is representative of this movement.

The technique by which the movement of the pilot-operated aircraft control device 108 may be used to determine if the pilot is fatigued may also vary. It is noted, however, that aircraft pilots, when manually flying an aircraft, typically implement what are referred to herein as micro-corrections, which are relatively small corrections to the flight path of the aircraft. As such, the movements of the pilot-operated aircraft control device 108 by an alert, non-fatigued pilot are typically relatively low-intense movements. When a pilot becomes fatigued, and is thus relatively less alert, the rate of these micro-corrections will decrease.

As a result, the pilot will implement fewer, but relatively higher-intensity movements of the pilot-operated aircraft control device 108. It may thus be appreciated that in some embodiments, the processor 106 is configured to detect the frequency and intensity of the movements of the pilot-operated aircraft control device 108, and determine when the pilot is fatigued based on the detected frequency and intensity of the movements.

It has also been found that fatigued pilots may have difficulty maintaining level flight, resulting in a relatively high variance in altitude. Thus, as FIG. 1, further depicts, the processor 106 may also be coupled to receive an aircraft altitude signal 132 from, for example, on-board avionics systems, and that is representative of aircraft altitude. The processor 106 may additionally be configured, upon receipt of this signal 132, to determine the variance in aircraft altitude over a predetermined period of time (e.g., the past N-seconds), and use this variance to determine whether the pilot is fatigued. A measure such as Root Mean Square (RMS) error or similar may be used.

The processor 106, as FIG. 1 further depicts, is preferably configured to implement a model 134 that has been trained by a machine learning algorithm 136. The machine learning algorithm 136, which may be any one of numerous known machine learning algorithms, was experimentally developed to detect control device movement patterns that are representative of both alert pilots and fatigued pilots. It will be appreciated that in some embodiments, the model 134 is adaptable, in real-time, to individual pilots to further train and/or tune the system 100 to the current pilot.

The system and method described herein allow pilot fatigue to be detected in a manner that is non-intrusive to both pilots and the aircraft, and that is relatively inexpensive to implement.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A pilot fatigue detection system for an aircraft that includes at least an airframe and a pilot-operated aircraft control device, the system comprising:
   a sensor configured to detect movements of the aircraft control device and provide a signal representative of detected movements of the aircraft control device; and
   a processor coupled to receive the signal representative of the detected movements of the aircraft control device from the sensor, the processor configured, upon receipt of the signal, to determine when the pilot is fatigued, wherein:
      the processor implements a model that has been trained by a machine learning algorithm to determine when the pilot is fatigued;
      the machine learning algorithm was experimentally developed to detect control device movement patterns that are representative of both alert pilots and fatigued pilots; and
      the model is adaptable, in real-time, to individual pilots to be further trained and tuned to a current pilot.

2. The system of claim 1, wherein the processor is further configured to generate an alert signal upon determining that the pilot is fatigued.

3. The system of claim 2, further comprising:
   a pilot feedback device coupled to receive the alert signal and configured, upon receipt thereof, to generate pilot feedback.

4. The system of claim 3, wherein the pilot feedback device is configured to generate one or more of aural, visual, and haptic pilot feedback.

5. The system of claim 1, wherein:
   the signal representative of the detected movements of the aircraft control device is a first signal and the sensor is a first sensor, the first sensor coupled to the aircraft control device;
   the system further comprises a second sensor coupled to the airframe, the second sensor configured to detect movements of the airframe and provide second signal representative thereof; and
   the processor is further coupled to receive the second signal and is further configured to compare the first and the second signals to thereby detect the movements of the aircraft control device only.

6. The system of claim 5, wherein one or both of the first and second sensors comprise inertial measurement units (IMUs).

7. The system of claim 5, wherein one or both of the first and second sensors are disposed within hand-held devices that are removable from the aircraft.

8. The system of claim 1, further comprising:
   a fly-by-wire system configured to supply the signal representative of the detected movements of the aircraft control device.

9. The system of claim 1, wherein the processor is further configured to:
   detect frequency and intensity of the movements of the aircraft control device; and
   determine when the pilot is fatigued based on the detected frequency and intensity of the movements.

10. The system of claim 9, wherein:
    the processor is further coupled to receive an aircraft altitude signal representative of aircraft altitude; and
    the processor is further configured, upon receipt of the aircraft altitude signal, to (i) determine a variance in aircraft altitude over a predetermined period of time and (ii) use the variance to determine when the pilot is fatigued.

11. The system of claim 1, wherein the processor is further adapted to receive an autopilot engagement signal that indicates aircraft autopilot is engaged, the processor is further configured, upon receipt of the autopilot engagement signal, to stop determining when the pilot is fatigued.

12. A method of detecting pilot fatigue in an aircraft that includes at least an airframe and a pilot-operated aircraft control device, the method comprising the steps of:
    detecting, with a first sensor that is coupled to the aircraft control device, movements of the aircraft control device;
    detecting, with a second sensor that is coupled to the airframe, movements of the airframe;
    detecting frequency and intensity of the movements of the aircraft control device; and
    determining when the pilot is fatigued based on the frequency and intensity of the detected movements of the aircraft control device and the detected movements of the airframe.

13. The method of claim 12, further comprising generating an alert upon determining that the pilot is fatigued.

14. The method of claim 13, further comprising:
    generating one or more of an aural, visual, and haptic alert upon determining that the pilot is fatigue.

15. The method of claim 14, further comprising:
    comparing the detected movements of the aircraft control device and the detected movements of the airframe to thereby detect the movements of the aircraft control device only.

16. The method of claim 12, further comprising:
    processing an aircraft altitude signal representative of aircraft altitude to (i) determine a variance in aircraft altitude over a predetermined period of time and (ii) use the variance to determine when the pilot is fatigued.

17. The method of claim 12, further comprising:
    detecting when the aircraft autopilot is engaged; and
    stopping the determination of when the pilot is fatigued upon detecting that the aircraft autopilot is engaged.

18. A pilot fatigue detection system for an aircraft that includes at least an airframe and a pilot-operated aircraft control device, the system comprising:
    a first sensor adapted to be coupled to the aircraft control device, the first sensor configured, upon being coupled to the aircraft control device, to detect movements of the aircraft control device and provide first signals representative thereof;
    a second sensor coupled to the airframe, the second sensor configured to detect movements of the airframe and provide second signals representative thereof; and
    a processor coupled to receive the first signals and the second signals, and adapted to receive an autopilot engagement signal, the processor configured, upon receipt of the first signals and the second signals, to determine when the pilot is fatigued and generate an alert signal upon determining that the pilot is fatigued, the processor further configured, upon receipt of the autopilot engagement signal, to not determine when the pilot is fatigued.

* * * * *